April 19, 1960    D. A. COLLINGS    2,933,163
BRAKE SHOE CONNECTIONS
Filed Nov. 29, 1957    2 Sheets-Sheet 1

INVENTOR.
David A. Collings
BY Harry P. Canfield
Attorney

April 19, 1960     D. A. COLLINGS     2,933,163
BRAKE SHOE CONNECTIONS
Filed Nov. 29, 1957                       2 Sheets-Sheet 2
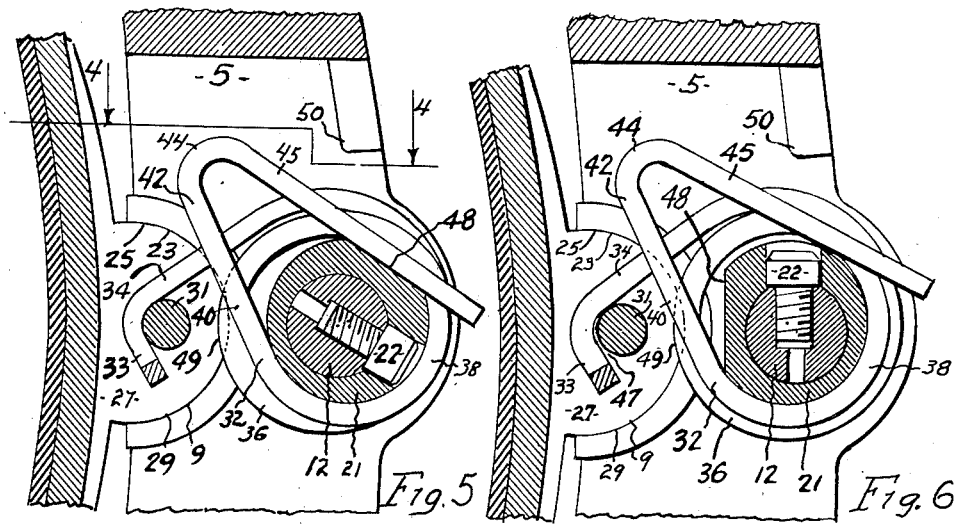
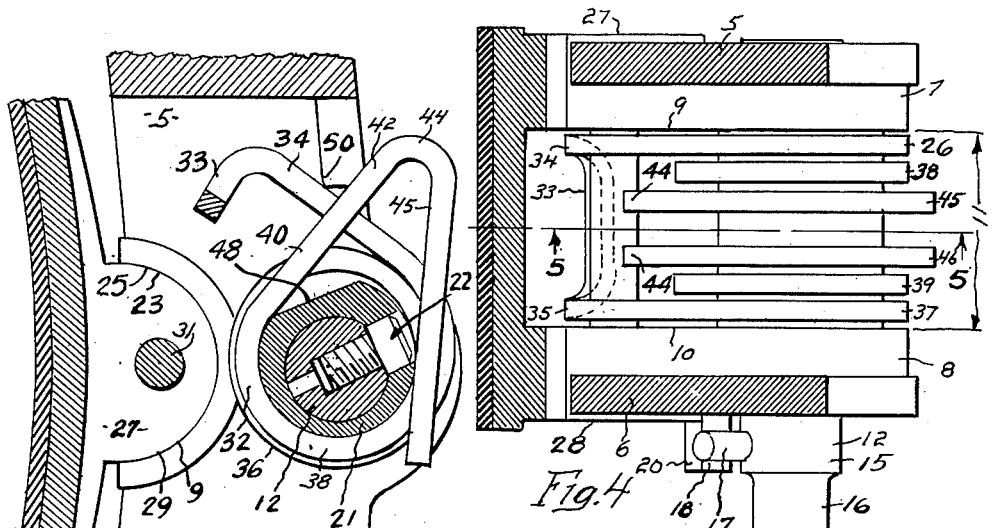
INVENTOR.
David A. Collings
BY
Attorney

United States Patent Office 2,933,163
Patented Apr. 19, 1960

2,933,163

BRAKE SHOE CONNECTIONS

David A. Collings, Cleveland, Ohio, assignor to The Clark Controller Company, Cleveland, Ohio, a corporation of Ohio Application November 29, 1957, Serial No. 699,659

4 Claims. (Cl. 188—220.1)

The invention hereof relates to brakes of the general class in which a brake shoe is moved into and out of frictional engagement with a cylindrical surface on a rotary brake drum.

In such brakes some kind of a mechanism element or arm is operatively moved toward and from the drum, and a brake shoe, between the arm and the drum has brake lining material on its front side formed cylindrically and to the same radius as the drum, and the back side of the shoe has a bearing connection with the arm on which the shoe can pivot up or down, to insure perfect conformity of the lining with the drum.

The present invention relates particularly to the bearing connections of such brake shoes.

The objects of the invention are:

To provide generally an improved connection between a brake shoe and its supporting mechanism member.

To provide friction in the shoe bearing to prevent tipping of the shoe when out of contact with the drum.

To minimize necessary clearance between shoe and drum when the shoe is disengaged therefrom.

To facilitate dismounting of the shoe, as for relining.

An embodiment of the invention is fully disclosed in the following description taken in connection with the accompanying drawing in which;

Fig. 4 is a sectional view from the plane 4—4 of Fig. 1;

Fig. 5 is a longitudinal sectional view from the plane 5—5 of Fig. 4 showing the shoe operatively connected to the arm, and showing an interlock between the shoe and the arm.

Fig. 6 is a view similar to Fig. 5, showing the shoe connection parts in positions ready to be operated to the condition of Fig. 5 to effect the shoe connection;

Fig. 7 is a view generally similar to Fig. 5, but showing the shoe connection parts in positions that disconnect the shoe from the arm and remove the aforesaid interlock, rendering the shoe readily removable from the arm;

Figure 1:
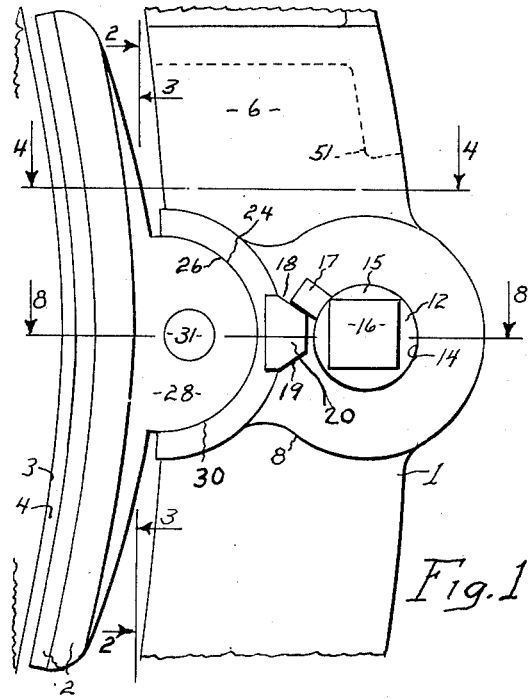
Fig. 1 is a side elevational view showing a fragment of an upright branched brake mechanism arm, and a fragment of a brake drum, with a brake shoe connected to the arm, according to the invention.

Referring to the drawing there is shown at 1, part of an upright brake mechanism arm on which the back side of a brake shoe 2 is mounted by a bearing connection on which the front of the shoe can pivot up and down.

The arm 1 as viewed in Fig. 1 is to be operatively reciprocated toward the left to engage the brake shoe 2 with a rotary brake drum 3, fragmentarily shown, or toward the right to disengage the shoe from the drum, and be stopped so as to leave a small clearance with the drum, indicated at 4.

Apart from the construction of the bearing connection between the shoe and arm, in which part of the invention resides, such mechanism arms and shoes are known, and the usual means employed to reciprocate the arm toward the brake is a spring, and to reciprocate it away from the drum is an electromagnet.

The bearing connection is constructed as follows.

The arm 1 comprises spaced side walls or branches 5—6 having thickened boss portions 7—8 projecting inwardly therefrom, with confronting faces 9—10 providing a space between the bosses of predetermined width indicated at 11.

A rotary shaft 12 bridges the space 11 and is mounted in rotary bearings 13—14 in the respective side walls bosses 7—8 and at one end at least extends beyond the bearing as at 15 Fig. 4, and is formed as at 16 to receive a wrench for turning it. See also Fig. 1.

A stop pin 17 is provided in the extended end 15 of the shaft engageable with stop surfaces 18 and 19 provided on a lug 20 on the arm 1, to stop rotation of the shaft 12 in opposite directions at predetermined points in its revolution.

Between the side wall bosses 7—8 a tubular eccentric cam 21 is mounted on the shaft 12, secured in a predetermined rotated position thereon, to rotate therewith, by a screw 22 going through the cam and screwed into the shaft, as best shown in Figs. 5 to 7.

The cam 21 is just long enough along the shaft 12 to engage the boss faces 9—10, and being secured to the shaft prevents shifting of the shaft axially.

The front sides or edges of the side wall bosses 7—8 facing the drum 3, have recesses 23—24 therein the concave surfaces 25—26 of which are of semi-cylindrical form, and of equal radius, and on a common axis preferably parallel to the drum axis.

On the back side of the shoe 2 is a pair of protuberances 27—28 spaced apart, the convex surfaces 29—30 of which are a little more than half of a cylinder in form, as shown in Fig. 1, and on a common axis and of equal radius and of the same radius as the recess surfaces 25—26.

Figure 3:
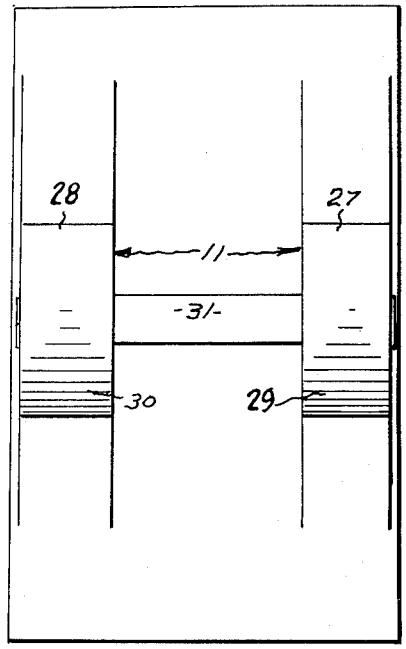
Fig. 3 is an elevational view generally from the plane 3—3 of Fig. 1, showing the back of the brake shoe, and protuberances thereon on, and with other parts omitted.

The protuberances 27—28 as best shown in Fig. 3 are spaced apart with approximately the aforesaid space 11 between them, and are bridged by a transverse pin 31 to be referred to; and are nested in the recesses 23—24; and the surfaces 29—30 and 25—26 are in mutual contact and constitute bearing surfaces on which the shoe 2 can be rocked up and down.

Under operating conditions the said surfaces of the protuberances and recesses are engaged in said mutual contact under spring pressure to fully connect the shoe to the arm; and the spring pressure may be released to disconnect the shoe to permit it to be removed; by the manual operation of a device now to be described, comprising the said shaft 12, and cam 21, and a spring indicated generally at 32.

The spring 32 is formed from a length of spring wire, bent at its middle to provide a hook 33 at the ends of two spaced rectilinear parallel hook shanks 34—35 which continue into generally circular, axially spaced, axially outer portions 36—37 of relatively large diameter, and generally coaxial with the shaft 8, see Figs. 4 to 7.

The circular portions 36—37 continue into generally circular coaxial inner portions 38—39 between the circular portions 36—37 and of smaller diameter than the circular portions 36—37. The circular portion 38—39 continue into respective V-form portions 40—41 each comprising first rectilinear legs 42—43 joined at a bend 44 to second rectilinear legs 45—46; the legs 45—46 constituting the free end portions of the length of wire.

The circular spring portions, or convolutions 36—37 and 38—39 surround the cam 21 and the spring is in general supported thereby.

The pairs of V-legs 42—45 and 43—46 are on opposite sides of the cam 21 as shown in Figs. 5 to 7, and are spaced so as to be spread apart somewhat thereby; and being resilient, the cam 21 is frictionally gripped between the pairs of legs; and upon rotation of the cam with the shaft 12 to which it is secured as described, the frictional grip will tend to rotate the spring 32 as a whole in unison with the shaft.

Figure 8:
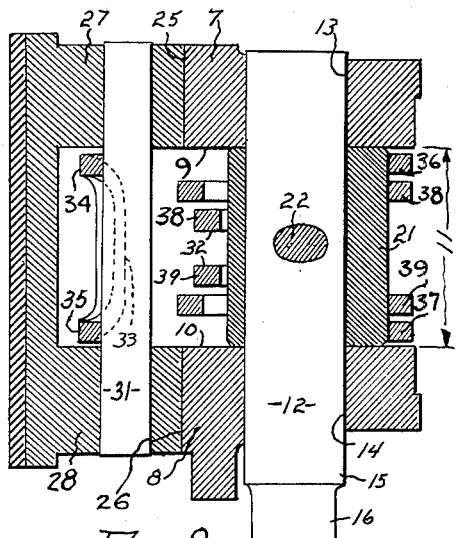
Fig. 8 is a sectional view from the plane 8—8 of Fig. 1.

As best shown in Fig. 4, and as indicated in Fig. 8, the parallel hook shanks 34—35 are at the axially opposite ends of the spring as a whole and are so spaced apart that they lie adjacent to the boss faces 9—10, whereby the spring as a whole substantially fills the space 11 between the bosses, and is thereby prevented from shifting axially.

In describing the operation of the aforesaid shoe connection device, it will be assumed that the shaft 12 has been rotated clockwise, the spring being rotated in unison with it by said friction, between the V-legs and the cam 21, until the hook 33 is in the elevated position of Fig. 7.

It will also be assumed that the shoe has been put in position with its protuberances 27—28 fully nested in the recesses 23—24, as shown in Fig. 7.

It is highly desirable to have very small clearance 4 between the shoe 2 and drum 3, and to have the arm 1 close to the drum; as shown in the drawings; and the positioning of the shoe is effected by sliding it in sidewise or edgewise, the surfaces 29—30 on the protuberances sliding axially on the surfaces 25—26 of the recesses.

The shaft 12 is then rotated counterclockwise, and the spring as before rotates in unison with it until, as shown in Figs. 4 and 6, the hook shanks 34—35 and hook 33 enter the space between the shoe protuberances 27—28, and the shanks come into contact with the shoe pin 31 and the hook 33 hooks over the pin.

As shown in Fig. 6 the coaxial convolutions 36—37 and 38—39 surrounding the cam, are in relaxed condition, and the hook 33 fits loosely over the pin 31, as indicated by a small clearance 47 in Fig. 6; and the shaft, in going from Fig. 7 to Fig. 6 makes only a fraction of a revolution.

Upon further rotation of the shaft 12, the spring cannot rotate with it because the spring shanks 34—35 are stopped on the pin 31; and the cam 21 then rotates within the spring convolutions. The shaft is rotated until its pin 17 is stopped on the stop surface 18, and during this rotation the parts go from the condition of Fig. 6 to that of Fig. 5.

As mentioned the circular convolutions of the spring, 36—37 and 38—39 in Fig. 6 were relaxed and concentric or coaxial. As the cam rotates within them, and being eccentric, its large radius portion comes around toward the right side, and exerts force on the inner circular convolutions 38—39 toward the right.

If the larger convolutions 36—37 and the shanks 34—35 and hook 33 were free to move, this force on the inside of the smaller convolutions 38—39 toward the right, would tend to move the larger convolutions 36—37, shanks 34—35 and hook 33 toward the right; but the hook being hooked over the pin 17 and not movable toward the right, the shanks 34—35 and larger convolutions 36—37 remain unmoved but are put under resilient tension; and the hook 33 on the pin 17 pulls the shoe protuberances 27—28 tightly into the recesses 23—24 and puts their contacting bearing surfaces under spring pressure, creating bearing friction thereat, as and for the purposes mentioned hereinbefore.

When, as in Fig. 5 as described, the shaft 12 and cam 21 have been rotated counterclockwise to the stopped position of the shaft, a flat face 48 on the cam comes parallel with the V-legs 45—46, and the legs bend resiliently into engagement with this face, and in effect lock the cam and shaft against rotation, except by manual rotation of the shaft.

The shoe 2 may not be removed from the arm 1, before rotating the shaft 12 in the clockwise direction all the way to its stopped position, to restore the parts to the condition of Fig. 7, whereupon the shoe may be withdrawn edgewise.

It will be noted that the shoe 2 is prevented from drifting in either axial direction out of optimum working position.

Any tendency to drift will bring a protuberance 27 or 28 into direct contact with a hook shank 34 or 35, and the hook shanks are closely adjacent to the faces 9—10 of the bosses 7—8 and cannot shift axially.

It is possible for the connection device as thus far described to be misused, or carelessly operated by an attendant, or by unauthorized personnel. For example, the shaft 12 might be rotated clockwise just far enough to relieve the tension in the hook shanks 34—35, and to rotate the spring in unison with the shaft and raise the hook 33 above the shoe protuberances 27—28, and to leave it in that position.

During subsequent reciprocations of the arm 1, the shoe could not fall downwardly off of the arm by gravity, because there would not be room for the protuberances to come entirely out of the recesses 23—24, and the shoe, although loose at its bearing connection, would continue to be engaged and disengaged with the drum and effect braking action, although in an abnormal manner.

However, in the absence of other provisions the loose shoe might then drift axially and finally fall off of the arm, and to prevent this the following means is provided.

When the spring convolutions are in relaxed condition, as they appear for example in Fig. 6, the circular convolutions 36—37 are of great enough outside diameter to overlap the shoe protuberances 27—28 by a small amount as indicated at 49.

This overlap would continue to be present if the spring were rotated in the aforesaid accidental or unwanted instance to raise the hook above the protuberances, loosening the shoe and permitting it to drift axially.

As shown in Figs. 4 and 8, these convolutions 36—37 are just inside axially of the hook shanks 34—35 and only a short distance axially from the shoe protuberances; so that drift of the shoe axially will be stopped by engagement of the protuberances with these overlapping convolutions after a small amount of drifting; and the shoe will go on engaging and disengaging the drum and effecting braking action although in an abnormal manner. The abnormality of its operation will be observed by an attendant and the fault corrected by rotating the shaft back to its correct position.

If, as stated above, the convolutions 36—37 are made large enough in diameter to overlap the shoe protuberances 27—28, when the hook is in an elevated position, then they obviously will extend inwardly beyond the concave surfaces 25—26 of the recesses 23—24, and in the absence of other provision would be obstructions in the way of the protuberances 27—28 when, as described, they are being slid into or out of the recesses, during mounting of the shoe on the arm or removing it therefrom.

To prevent this the following means is provided, with particular references to Fig. 7.

Figure 2:
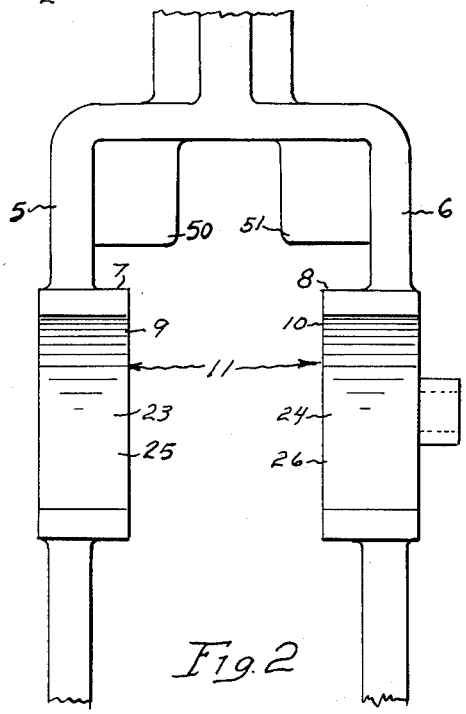
Fig. 2 is an elevational view from the plane 2—2 of Fig. 1 showing bearing recesses in the front of the branched brake arm with other parts omitted.

Rotation of the shaft 12 clockwise and the spring in unison with it, as described, raises the hook shanks 34—35 until as in Fig. 7 they come into contact with abutments 50–51 provided on the arm, Figs. 7 and 2. The spring is thereby stopped from rotating with the shaft, and further rotation of the shaft, and the cam 21 with it inside of the convolutions, brings the large diameter side of the cam 21 toward the right, and it pushes toward the right on the insides of the smaller convolutions 38—39, and thereby moves all of the convolutions toward the right.

As shown in Fig. 7, by the time the shaft has been stopped as described in its clockwise revolution, the large convolutions will have been withdrawn toward the right far enough to be outside of the concave surfaces 25—26 of the recesses and the aforesaid obstruction thereby will have been obviated.

I claim:

1. The combination of a brake shoe formed on its front side to conform to the braking surface of a brake drum, and a brake mechanism arm reciprocable toward and from the drum to engage and disengage the shoe with the drum; the shoe supported at its rear side upon the mechanism arm by a bearing having an axis parallel to the drum axis, on which the forward part of the shoe can rotate up and down; the bearing comprising bearing surfaces, one convex and the other concave, one on the shoe and the other on the arm, and nested together; a device on the arm comprising a spring, and a shaft mounted for rotation on the arm rearwardly of the nested bearing surfaces, and the shaft having an eccentric cam thereon; the spring formed from linear material and comprising an intermediate portion surrounding the cam and continuing therefrom into a hook portion, and oppositely into a resilient finger portion frictionally engaged with the cam to cause the spring to tend to rotate with the shaft; the shaft upon being rotated in one direction rotating the hook portion with it to hook it over an abutment provided on the back of the shoe, and upon continued rotation causing the cam surface to propel the intermediate spring portion rearwardly and thereby draw the hook portion toward the shaft with spring force and cause the hook portion to apply the spring force to the shoe through the abutment and thereby hold the nested bearing surfaces in nested condition under spring pressure and in mutual frictional engagement; and the shaft upon being rotated in the other direction first relieving the spring force on the hook portion and the frictional engagement of the nested surfaces, and upon continued rotation rotating the hook portion free from the abutment.

2. The combination described in claim 1 and in which the spring is proportioned so that the friction between the mutually engaged nested bearing surfaces produced by the spring, is sufficient to prevent the front of the shoe from being rotated downwardly by gravity when disengaged from the drum.

3. The combination described in claim 1 and in which the brake shoe disengages the brake drum with small clearance, and the brake shoe may be removed from the arm by first relieving the spring effected pressure of the nested bearing surfaces and then sliding the shoe sidewise on its bearing surfaces in the direction of the bearing axis.

4. In a brake for braking rotation of a drum; an arm movable toward and from the drum; the arm comprising parallel branches with a space between the branches; aligned spaced bearing recesses in the branches open forwardly toward the drum; a brake shoe forward of the arm having spaced bearing protuberances nested in the recesses; a shaft bridging the branches, and rotatable thereon; a wire spring comprising circular portions around the shaft and a hook portion extending toward the shoe; the spring being rotatable with the shaft in one direction to hook the hook portion over a pin element on the back of the shoe between the protuberances, to hold the shoe on the arm; the spring filling space between the branches to prevent axial shifting thereof; the circular portions of the spring projecting into the space between the shoe protuberances and preventing axial shifting of the shoe; the hook being rotatable with the shaft in the other direction to remove the hook portion from the shoe pin; and concurrently retracting the circular portions of the spring from between the shoe protuberances to permit the shoe to be shifted axially to remove it from the arm.

References Cited in the file of this patent

UNITED STATES PATENTS

| | | |
|---|---|---|
| 362,773 | Neichter | May 10, 1887 |
| 472,075 | Potter | Apr. 5, 1892 |
| 953,148 | Le Beau | Mar. 29, 1910 |
| 957,251 | Porter | May 10, 1910 |